H. M. LAMBERT.
VEHICLE WHEEL.
APPLICATION FILED FEB. 15, 1913. RENEWED APR. 7, 1917.
1,260,029.
Patented Mar. 19, 1918.
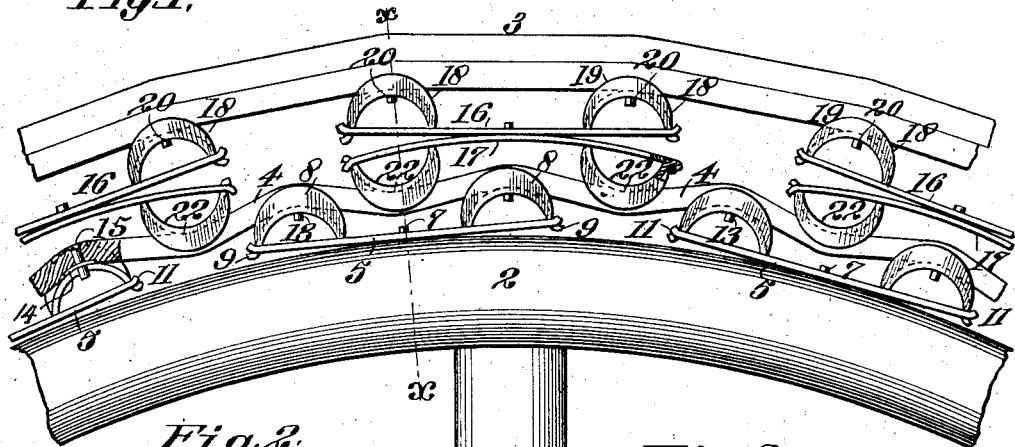
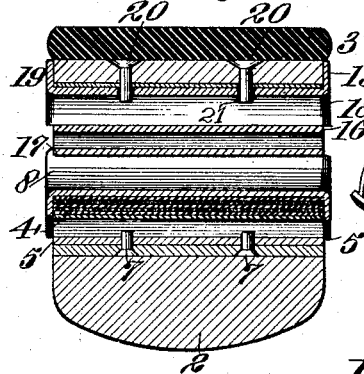
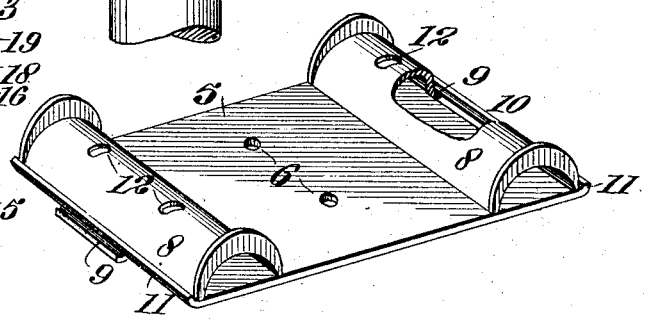
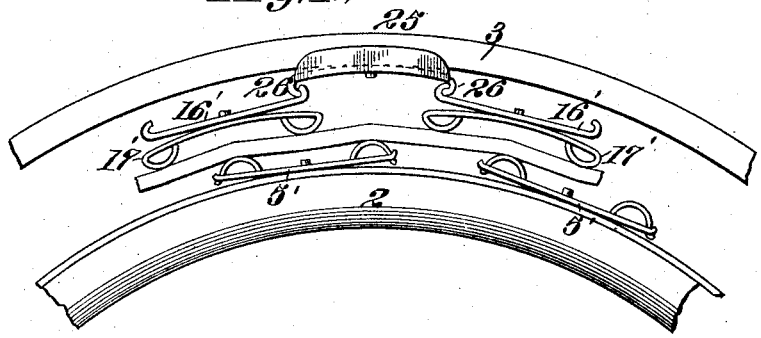
WITNESSES:
Charles Pickles
F. E. Maynard.
INVENTOR
Henry M. Lambert
BY G. H. Strong
ATTORNEY

UNITED STATES PATENT OFFICE.

HENRY M. LAMBERT, OF PORTLAND, OREGON, ASSIGNOR TO OLIVER A. SHAW, OF OAKLAND, CALIFORNIA.

VEHICLE-WHEEL.

1,260,029.         Specification of Letters Patent.      Patented Mar. 19, 1918.

Application filed February 15, 1913, Serial No. 748,615. Renewed April 7, 1917. Serial No. 160,543.

*To all whom it may concern:*

Be it known that I, HENRY M. LAMBERT, a citizen of the United States, residing at Portland, in the county of Multnomah and State of Oregon, have invented new and useful Improvements in Vehicle-Wheels, of which the following is a specification.

This invention relates to resilient wheels of the type involving a central floating wheel part, with a rim or felly encompassed by a tire or tread spaced from the felly of the wheel part by a mechanical structure designed to produce a cushioning effect similar to that of an ordinary pneumatic tire.

It is one of the important objects of the present invention to provide a cushioning structure for vehicle wheels or other adaptations which will be of comparatively shallow thickness or projection from the surface of the felly of the wheel, and which cushioning structure consists of few, simple and substantial parts, so designed, arranged and mounted that it is impossible for the elements to tilt or upset to inoperative or dangerous angular position.

The invention consists in combination with a wheel structure, of circumferentially spaced leaf springs adjustable on the rim of the wheel structure, a tensioning band supported upon said springs, and an outside tire or tread so constructed and arranged as to be supported on said band intermediate of said spring supports as to yield and react as the wheel travels along the ground.

Figure 1 is a side elevation partly in section of a fragment of the improved wheel.

Fig. 2 is a cross section of the wheel on line X—X, Fig. 1.

Fig. 3 is a perspective view of one of the springs.

Fig. 4 shows a fragment of a modification of the wheel.

In my present invention 2 represents a portion of a felly of a wheel, and 3 is an outside tread member suitably spaced from the felly. Between the felly 2 and the tire or tread 3 is interposed my cushioning structure for obtaining the desired resiliency of the wheel. The cushioning structure consists of a non-stretching band 4 of fabric or other suitable material, between which and the felly 2 are interposed the flattened springs 5, which are centrally perforated, as at 6, to receive the stop pins 7 projecting from the felly 2 of the wheel; the springs reacting against the felly when subjected to load.

I have shown each spring 5 as consisting of a substantially flat strip or strips of appropriate length and of a width approximating the width of the felly 2; each of the springs 5 being provided at its ends with the outwardly projecting bridges or supports 8 over which the tensioning band 4 is suitably stretched. While the bridges 8 of each spring 5 may be formed integrally with the spring body, I have shown in Fig. 3 a bridge 8 as provided at one edge with a hook 9 adapted to be inserted through a slot or aperture 10, of which there is one at each end of the bridge 5; the latter being provided with upturned flanges 11 with which the hooks 9 of the bridges 8 interlock. The opposite parallel edge of each of the bridges 8 rests freely on the upper or outer surface of its respective spring 5.

For the purpose of preventing the band 4 from circumferential creep, some or all of the bridges may be slotted or perforated, as at 12, to receive the pins 13 projecting inwardly through wearing plates or shoes 14 riveted, as at 15, to the inner surface of the band 4.

The tire 3, which is preferably flexible, is supported on the band 4 by a plurality of circumferentially spaced compound springs 16—17 each similar to the springs 5; the outer springs 16 having end bridge portions 18 formed or interlocked with their respective spring members 16, which outer bridge members engage and support the rim 3. Each of the bridge members 18 has at its outer ends upturned lips or flanges 19 for preventing lateral movement of the tread 3, though this may be accomplished by inwardly projecting pins 20 of the tread 3 engageable with the walls of a slot or aperture 21 formed in each bridge for the purpose of preventing circumferential movement of the tread 3.

The cushioning springs 17 are placed in opposed, inverted position beneath respective springs 16 and are of similar character, each having transverse supports or inverted arcuate bridges 22 resting upon the outer surface of the band 4 at positions intermediate of the supporting bridges 8, beneath the band 4. The several supporting springs 5, 16 and 17 may be of appropriate construction, proportion and design and each may be of arcuate form, although the springs 5 and 16 may be flat; the former resting on the curved, outer surface of the felly 2 and therefore being yieldable to and fro, with relation thereto, freely. The springs 17 may be of arcuate form and their superposed springs 16 of flat section; the desired resiliency of these two being permitted by the flexure of each toward and from each other.

From the foregoing it will be seen that by using a plurality of almost flat springs 5, 16 and 17, spaced circumferentially about the felly 2 and oppositely reacting upon the non-elastic band 4, and the outer springs being encompassed by and supporting at regular spaced intervals the tire 3, I obtain a cushion of comparatively shallow thickness or depth between the felly 2 and the rim 3.

The tread or tire 3 is preferably composed of a flexible material, which, when subjected to the outward pressure of the several supporting bridges 18 regularly spaced within the tire 3, will be distended so that its circumferential bearing surface will, instead of being a true circle, take the form of a polygon of many sides, the apices or angles of which will be formed adjacent to and over the bridge members 18, between which the outer surface of the tire 3 will become flat planes. One of the important advantages of this effect will be to provide a practically knobby, anti-skidding bearing traction surface for the tire 3.

In Fig. 4 is shown a modification of the wheel, in which the tire is supported on rigid links 25 having hooks 26 at their ends engageable with and bearing upon outer springs 16'. The outer springs 16' are supported by springs 17', the transverse ends of which are supported upon the band 4. This latter is in turn supported by the felly springs 5'. This type of cushion is useful particularly with heavy vehicles.

This tire, in respect to its operation, when meeting both small and large obstacles simulates the action of a pneumatic tire. The first phase of this operation, which is obtained in pneumatic tires by the instantaneous yielding of the tire at the point of impact, I accomplish by reason of the fact that the springs at the point of impact will be compressed to accommodate slight obstructions, such as small stones and lumps, in the roadway and instantly spring back to place. The second phase of the operation, namely, that of protecting the wheel against collapse when meeting large obstacles, which is obtained in pneumatic tires through the compression of the air in the tire around the entire wheel, I accomplish by the provision of the non-stretchable belt 4. Thus a large obstruction will cause inward bending of the belt at the point of contact and all of the resilient supporting members 5 are caused to be compressed at once, owing to the non-stretchable character of the belt, and thus the rim of the wheel is reinforced at all points throughout its circumference and is protected against breakage.

Having thus described my invention, what I claim and desire to secure by Letters Patent is—

1. In a resilient tire and wheel, a flexible fabric tread, a tensioned, flexible, concentric inner cushioning band, reversed, opposed, tangential spring supports reacting oppositely at their ends upon the adjacent portions of the tread and band, and tangentially arranged spring supports resting on the wheel felly, the opposite ends of the supports reacting upon the band at places intermediate the aforesaid supports.

2. The combination in a wheel, of a rigid inner rim and an outer elastic tire, a circumferential series of spaced spring members approximately tangential with and in the plane of the rim and centrally fulcrumed thereon so that the free ends of the springs have a limited spring movement radially of the wheel, outwardly projecting blocks on the ends of said springs, a circumferential, flexible band encircling the springs and supported on said blocks, and means for yieldingly supporting the tire at intervals on said band at points intermediate of said blocks, said last named means comprising bowed springs placed back to back and interposed between the band and tire and having oppositely extending end bridges seating respectively on the band and tire.

3. A spring wheel comprising a rigid inner rim, an encircling tire, a circumferential series of spaced spring devices each comprising a spring member secured centrally to the rim to allow the ends to move toward and from the rim, and outwardly extending bridge members on the opposite ends of the spring member, a flexible band encircling the spring devices and receiving support from the bridge members, and a second series of spring devices interposed between the band and encircling tire, each of the second spring devices comprising a spring member supported from the tire whereby its ends may move toward and away from the rim and inwardly extending bridge members on the opposite ends of the spring member for engaging with the flexible band, one bridge member engaging with the band between the points of support from the companion bridges of the opposing rim carried spring device and the other bridge member engaging with the flexible band between the adjacent bridges of the specified opposing device and its adjacent device.

4. A spring wheel comprising a rim, an encircling flexible tire, a flexible cushioning band interposed between the rim and tire, tangential spring supports interposed between the tire and band and each consisting of bowed springs arranged back to back and having on their ends oppositely extending bridges seating respectively on the band and tire, and tangentially arranged, supports each secured centrally to the rim to have its ends free to move toward and away from the rim, the ends of the second supports supporting the band at points intermediate the bridges of the first supports.

5. A spring wheel comprising, in combination, a rim, an encircling tire, a circumferential series of spaced tangential spring supports secured on the rim and having outwardly extending bridges provided with slots, a flexible band surrounding the spring supports and having inwardly extending pins engaging in the slots of the bridges to permit of limited relative circumferential movement of the band, and spring supports arranged between the tire and band and engaging with the band at points intermediate the bridges of the first spring supports.

6. In combination, a vehicle wheel, a flexible and compressible tire thereon, a flexible, corded band on which the tire is supported spaced radially from the wheel rim, the cords in said band being stretched to their approximate limit of elongation before being laid, whereby to remove substantially all stretch therefrom, and yielding supports between said band and wheel rim, whereby the stretchless band, when flexed inwardly by the tire in meeting a large obstruction, will cause the supports throughout the circumference of the wheel rim to be compressed.

7. In combination, a vehicle wheel and a cushion tire therefor, comprising a flexible, corded band spaced radially from the wheel rim, the cords in said band being stretched to their approximate limit of elongation before being laid, whereby to remove substantially all stretch therefrom, yielding supports interposed between said band and the rigid rim of the wheel, a flexible band spaced radially from said non-stretchable band and constituting the tread of the tire, and resilient spacers between said tread and non-stretchable bands.

In testimony whereof I have hereunto set my hand in the presence of two subscribing witnesses.

HENRY M. LAMBERT.

Witnesses:
JOHN H. HERRING,
W. W. HEALEY.

Copies of this patent may be obtained for five cents each, by addressing the "Commissioner of Patents, Washington, D. C."